United States Patent
Broms et al.

(10) Patent No.: US 9,443,072 B2
(45) Date of Patent: Sep. 13, 2016

(54) METHODS AND DEVICES FOR GRANTING ACCESS TO AND ENABLING PASSCODE PROTECTION FOR A FILE

(71) Applicant: Sony Corporation, Tokyo (JP)

(72) Inventors: Hans Daniel Broms, Lund (SE); Johan Gulliksson, Bjarred (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 225 days.

(21) Appl. No.: 14/229,257

(22) Filed: Mar. 28, 2014

(65) Prior Publication Data

US 2015/0278502 A1 Oct. 1, 2015

(51) Int. Cl.
| | | |
|---|---|---|
| *G06F 21/31* | (2013.01) | |
| *G06F 21/36* | (2013.01) | |
| *G06F 21/62* | (2013.01) | |
| *G06F 3/0484* | (2013.01) | |
| *G06F 3/0488* | (2013.01) | |

(52) U.S. Cl.
CPC ............. *G06F 21/36* (2013.01); *G06F 3/0488* (2013.01); *G06F 3/04842* (2013.01); *G06F 21/31* (2013.01); *G06F 21/6209* (2013.01); *G06F 21/6218* (2013.01)

(58) Field of Classification Search
None
See application file for complete search history.

(56) References Cited

U.S. PATENT DOCUMENTS

| | | | | |
|---|---|---|---|---|
| 6,282,304 | B1 * | 8/2001 | Novikov | G06F 3/03543 340/5.83 |
| 6,615,264 | B1 * | 9/2003 | Stoltz | G06F 21/31 709/225 |
| 7,158,776 | B1 * | 1/2007 | Estes | H04L 63/02 380/247 |
| 8,769,624 | B2 * | 7/2014 | Cotterill | G06F 21/35 455/41.1 |
| 2005/0239445 | A1 * | 10/2005 | Karaoguz | H04L 12/2803 455/414.1 |
| 2006/0294391 | A1 | 12/2006 | Wu | |
| 2007/0240202 | A1 * | 10/2007 | Sullivan | H04L 12/14 726/4 |

(Continued)

FOREIGN PATENT DOCUMENTS

EP 2390812 A1 11/2011

OTHER PUBLICATIONS

Chen et al, "New Authentication Method for Mobile Centric Communications", 2005.*

(Continued)

*Primary Examiner* — Hung Le

(74) *Attorney, Agent, or Firm* — Coats & Bennett, P.L.L.C.

(57) ABSTRACT

Methods and electronic devices configured to grant access to a file, and of enabling passcode protection for a file. The methods may include displaying file icons corresponding to the files. Upon receiving a selection of one of the displayed files, a request for the passcode is presented to the user if the selected application is protected. If the application is not protected, the file is accessed without receiving the passcode. The file icons may be displayed in a manner indicating that certain ones of the files require a passcode for access.

4 Claims, 13 Drawing Sheets

(56) References Cited

U.S. PATENT DOCUMENTS

| | | | |
|---|---|---|---|
| 2008/0295017 A1* | 11/2008 | Tseng | H04M 1/72583 715/777 |
| 2009/0158212 A1* | 6/2009 | Dykstra-Erickson | G06F 3/0482 715/811 |
| 2010/0024020 A1* | 1/2010 | Baugher | G06F 21/6245 726/7 |
| 2010/0024028 A1* | 1/2010 | Baugher | G06F 21/62 726/17 |
| 2012/0054625 A1* | 3/2012 | Pugh | G06F 21/41 715/736 |
| 2014/0006772 A1 | 1/2014 | Qureshi et al. | |
| 2014/0109201 A1* | 4/2014 | Israel | G06F 21/31 726/5 |
| 2015/0019254 A1* | 1/2015 | Ibikunle | G06F 21/6245 705/3 |

OTHER PUBLICATIONS

HACJ2LEARN, "Lockdown Pro for iOS 7—Protect apps with a password", Jan. 1, 2014, pp. 1-6 retrieved on Sep. 23, 2015, retrieved from Internet: http://www.hack2learn.org/2014/01/01/lockdown-pro-fuer-ios-7-apps-mit-passwort-schuetzen.

Partial Extended European Search for EP Application No. 15156722.9 mailed on Sep. 8, 2015.

Display screens of mobile device. Viewed online Jan. 8, 2014, at http://gheymann.files.wordpress.com/2011/04/screen-shot-folders.png.

Display screens of mobile device. 11 pages. As of Aug. 28, 2013. Accessed at http://web.archive.org/web/20130828034327/http://thebigboss.org/lockdown-pro-v-2-0-now-available.

* cited by examiner

METHODS AND DEVICES FOR GRANTING ACCESS TO AND ENABLING PASSCODE PROTECTION FOR A FILE

TECHNICAL FIELD

The present application is directed to methods and devices for granting access to a file and to enabling passcode protection for a file.

BACKGROUND

Electronic devices, such as smartphones and computing devices, include an initial display screen that requires entry of a passcode. Once the correct passcode has been entered, icons are displayed that correspond to the various files (e.g., smartphone applications, photos, documents, etc.). The user is able to select the desired icon to access the corresponding file.

Current devices require that the user enter a passcode as an initial step in using the device. Prior to entry of the passcode, a user is not able to access any files on the device. The device is configured to require the initial passcode prior to allowing access to these files. Further, the device has little to no functionality until the passcode is input. Some functionality prior to passcode input may include the ability to make an emergency phone call (when the device is equipped for wireless communications), or display the time and/or date on the initial display screen.

Thus, a user is not able to access desired files until entry of the passcode. However, many of the files on a device are non-sensitive such that passcode protection is not required. Example files may include various mobile applications such as games, calculators, and maps, and certain photos, videos, and audio files. However, because of the device configuration, these non-sensitive files are not accessible until entry of the passcode.

Entry of the passcode is often cumbersome or aggravating for the user. This frustration is multiplied when the user does not feel that passcode protection is necessary for a desired file.

SUMMARY

The present application is directed to methods and devices or granting access to files by a user, and enabling passcode protection for files. The methods and devices provide for an improved experience for the user.

One aspect of the invention is directed to a method performed by a computing device of allowing access to files during a session. The method includes presenting a first group of display icons on an electronic display that each correspond to one or more objects that are each protected by a different authentication prior to access.

The method may also include simultaneously presenting a second group of display icons on the electronic display that each correspond to one or more objects that are not protected and do not require authentication prior to access.

The method may also include receiving an input through a touch screen of one of the first group of display icons and presenting an input screen on the display requesting input of a passcode.

The method may also include that prior to presenting the first group of display icons, presenting a lock screen to the user which includes at least one input element, receiving user input via the at least one input element, and initiating the current session responsive to the received user input successfully unlocking the computing device.

The method may also include visually differentiating the display icons to indicate that a different passcode is required for entry.

Another aspect of the invention is directed to a method performed by a computing device of granting access to files during a session. The method includes presenting a first plurality of display icons on an electronic display for accessing passcode protected files that are each protected by a same passcode. The method includes presenting a second plurality of display icons on the electronic display for accessing files that are not protected by the passcode. The method includes receiving a selection of one of the display icons from a user. If the selected display icon links to a file that is not passcode protected by the passcode, granting access to the file without requiring entry of the passcode. If the selected display icon links to a passcode protected file and the passcode has already been received during a current session, granting access to the file without requiring entry of the passcode. If the selected display icon links to a passcode protected file and the passcode has not already been received during the current session, presenting a request for the passcode and granting access to the file after receiving the passcode.

The method may also include presenting a third plurality of display icons on the electronic display for accessing passcode protected files that are each protected by a second passcode, receiving the selection of one of the display icons from the user, if the selected display icon links to a file protected by the second passcode and the second passcode has already been received during a current session, granting access to the file without requiring entry of the second passcode, if the selected display icon links to a file protected by the second passcode and the second passcode has not already been received during the current session, presenting a request for the second passcode and granting access to the file after receiving the second passcode.

The method may also include segregating each of the first, second, and third plurality of display icons onto different areas on the electronic display.

The method may also include presenting a lock screen to the user which includes at least one input element, receiving user input via the at least one input element, and initiating the current session responsive to the received user input successfully unlocking the computing device.

Another aspect of the invention is directed to a method performed by a computing device of granting access to files during a session. The method includes presenting one or more first groups of display icons for accessing passcode protected files, wherein each group of icons uses a different shared passcode for its passcode protected files, and wherein within a single group each display icon uses the same shared passcode for its protected file. The method includes receiving a selection of one of the display icons from a user. If the selected display icon links to a passcode protected file that is protected by one of the shared passcodes and the shared passcode has already been received during a current session, granting access to the file without requiring entry of the shared passcode. If the selected display icon links to a passcode protected file that is protected by one of the shared passcodes and the shared passcode has not already been received during the current session, presenting a request for the shared passcode and granting access to the file after receiving the shared passcode.

The method may also include prior to presenting the first group of display icons, presenting a lock screen to the user which includes at least one input element, receiving user input via the at least one input element, and initiating the current session responsive to the received user input successfully unlocking the computing device.

The various aspects of the various embodiments may be used alone or in any combination, as is desired.

BRIEF DESCRIPTION OF THE DRAWINGS

FIG. 68 illustrates an exemplary lock screen display.

DETAILED DESCRIPTION

The present application is directed to methods of granting access to files by a user, and enabling passcode protection for a file. In one or more embodiments, the methods include displaying file icons corresponding to the files. The displayed file icons represent files that may be unprotected (i.e., do not require a passcode to access), or require varying amounts of passcode protection. Upon receiving a selection of one of the displayed icons, a request for a passcode is presented to the user if the application corresponding to the selected icon is protected. Once a passcode is received during a session, each of the files that share the passcode may be accessed without reentry of the passcode. If the file is not protected, the access to the file is granted without receiving the passcode (e.g., so that passcode entry may be bypassed entirely). The file icons may be displayed in a manner indicating that certain ones of the files require a passcode for access. The present application is also directed to electronic devices configured to perform various methods of granting access to a file, and of enabling passcode protection for a file.

The present methods may be used on a variety of different electronic devices 10, including but not limited to tablet computing devices (e.g., the iPAD, NOOK, KINDLE, etc.), laptop computing devices, ultra-mobile PCs, wearable computing devices, game consoles, Personal Digital Assistants (PDAs), and cellular telephones including "smartphones".

Traditional desktop computers have provided for a variety of user accounts, which could accommodate granular access to various files. This provided administrative users with a considerable amount of control over which users had access to various files (e.g., applications, images, videos, etc.). Most smartphone and tablet computing devices, however, rely on a single shared user account model, wherein once a device has been successfully unlocked (which typically requires passcode entry), all users have access to the same files on the device. Thus, sharing such devices may pose security concerns if it is desirable to restrict access to some files on the device to only a subset of users of the device. In one or more embodiments, the techniques described herein can introduce a greater degree of control within the environment of shared user accounts on smartphone and tablet computing devices.

Figure 1:
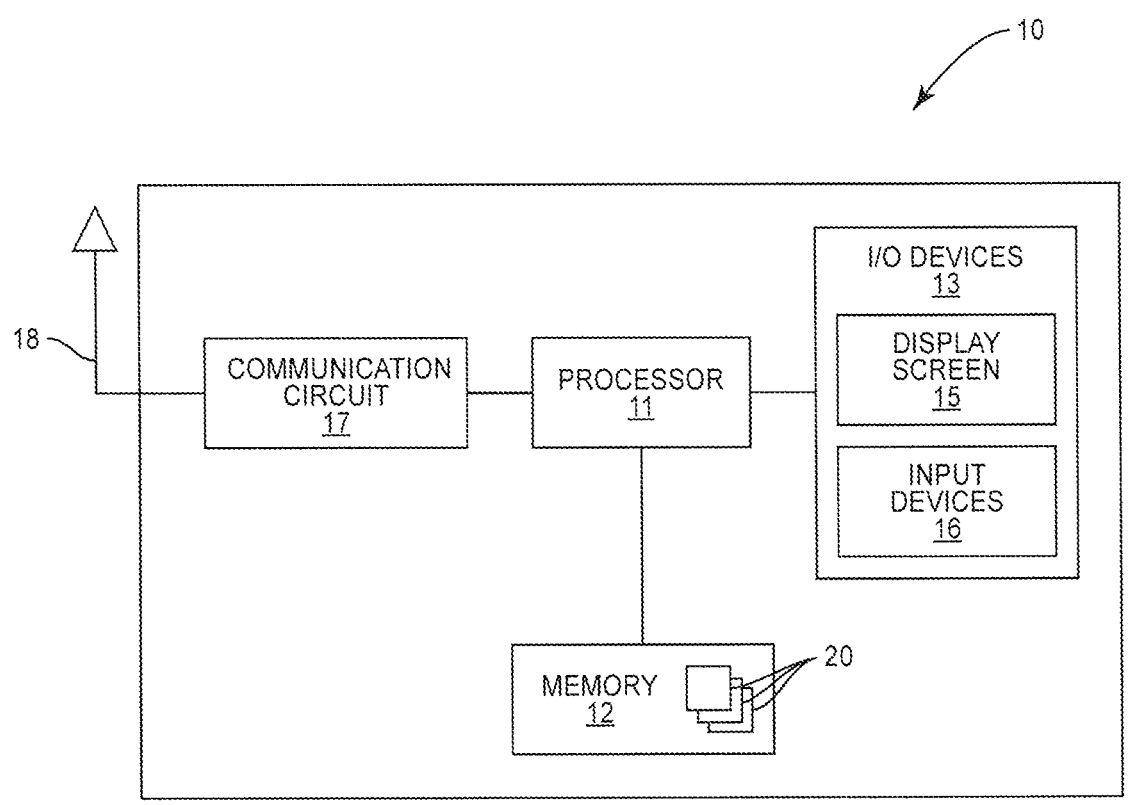
FIG. 1 is a schematic diagram of a device configured to perform the methods disclosed in the present application.

FIG. 1 schematically illustrates an example electronic device 10 operative to display and access files according to the disclosed methods. The device 10 includes a processor 11, a memory circuit 12, and one or more input/output (I/O) devices 13. The processor 11 is operatively connected to the memory circuit 12, and the one or more I/O devices 13, and is operable to implement the methods disclosed in this application. The processor 11 may include one or more application-specific integrated circuits (ASIC), digital signal processors (DSP), microprocessors, microcontrollers, or any combination thereof.

Memory circuit 12 is operatively associated with the processor 11 and includes a non-transitory computer readable storage medium storing program instructions, such as a computer program product, that configures the processor 11 to implement one or more of the techniques discussed herein. Memory circuit 12 may include various memory devices such as, for example, a hard disk, an optical storage device, a magnetic storage device, read-only memory, flash memory, or any suitable combination of these. Memory circuit 12 is configured to store one or more different types of files 20 that are saved by the device user. A variety of different files 20 may be saved in memory 12, including but not limited to smartphone applications, and media files such as videos, images, audio, and documents. One or more of the files 20 may also be stored at a remote location, such as at a remote server. The device 10 is configured to access these files 20 upon receiving a corresponding input from the user.

The one or more I/O devices 13 may include an electronic display 15 and an input device 16. In one or more embodiments, this includes a touchscreen display that simultaneously acts as a display and input device. Input devices 16 may also include a variety of other devices, including but not limited to a keypad, trackball and joystick.

The device 10 may also include a communications circuit 17 for communicating with other devices. The circuit 17 may include an antenna 18 to facilitate the communications. The circuit 17 may include a radio frequency transmitter and receiver for transmitting and receiving signals through the antenna 18. The communications circuit 17 may also include audio processing functionality to process voice data. The communications circuit 17 may further be configured to send and receive and process data such as electronic mail, text messages, files, and streaming audio and video.

The device 10 is configured to display, on the electronic display 15, icons 30 corresponding to the stored files 20. The icons 30 may include various formats, including but not limited to one or more graphical images and alphanumeric characters. In one or more embodiments, the device 10 is configured to display the icons 30 prior to entry of a passcode to inform the user of the files 20 that may be accessed. The user may select the desired icon 30 to access its corresponding file 20. The device 10 is configured to allow direct access to the files that are not passcode protected, and to require entry of the passcode prior to accessing protected files.

The passcodes prevent unauthorized access to the protected files. The passcode may include a variety of different formats, including an alphanumeric password, or a predefined touchscreen gesture, for example. Each of the protected files 20 may be protected by a single passcode, or different files 20 may be protected by different passcodes. Further, one or more of the files may be protected by multiple different passcodes. In one or more embodiments, a first security level of lower-priority files 20 may be protected by a first passcode (e.g., pin code 1111), and a second security level of higher priority files 20 may be protected by a second, more aggressive passcode (e.g., A8911BVW9). Various levels of priority files 20 may be included depending upon the needs of the user. In one or more embodiments, once a passcode has been entered during a session for a particular security level, each of the files 20 in that security level may be accessed without re-inputting the passcode. Once the session has expired or otherwise been terminated by the user, access to the files 20 again initially requires input of the passcode.

Figure 2:
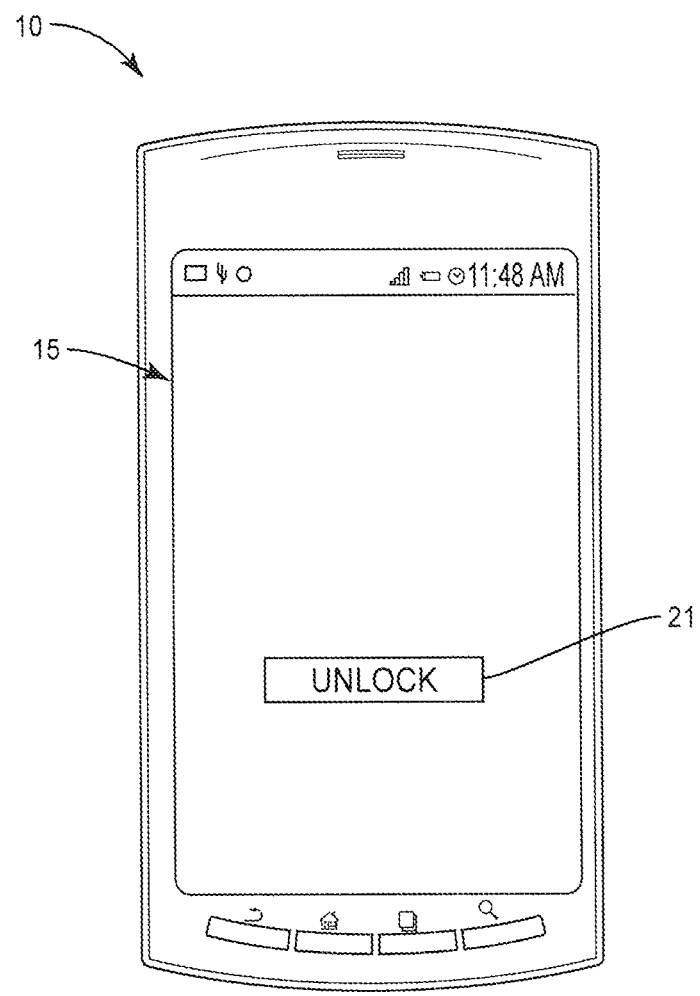
FIG. 2 illustrates an exemplary lock screen display that includes a slider bar.

Initially, the device 10 may include a first display on the electronic display 15 as illustrated in FIG. 2 when the device 10 is woken from a sleep mode (e.g., when the electronic display is turned OFF and/or when the device has been locked). The first display prompts the user input to unlock the device 10. In one or more embodiments, the input includes a user moving a slider bar 21 across a portion of the electronic display 15. Without the correct input, the device 10 remains in the locked mode and preventing further access to the additional information. In one or more embodiments, this is an initialization screen meant to prevent inadvertent access to the additional information and possibly inadvertent usage of the various functionality of the device 10. Other manners of unlocking the device 10 may include entry of a personal identification number and finger print recognition.

Figure 3:
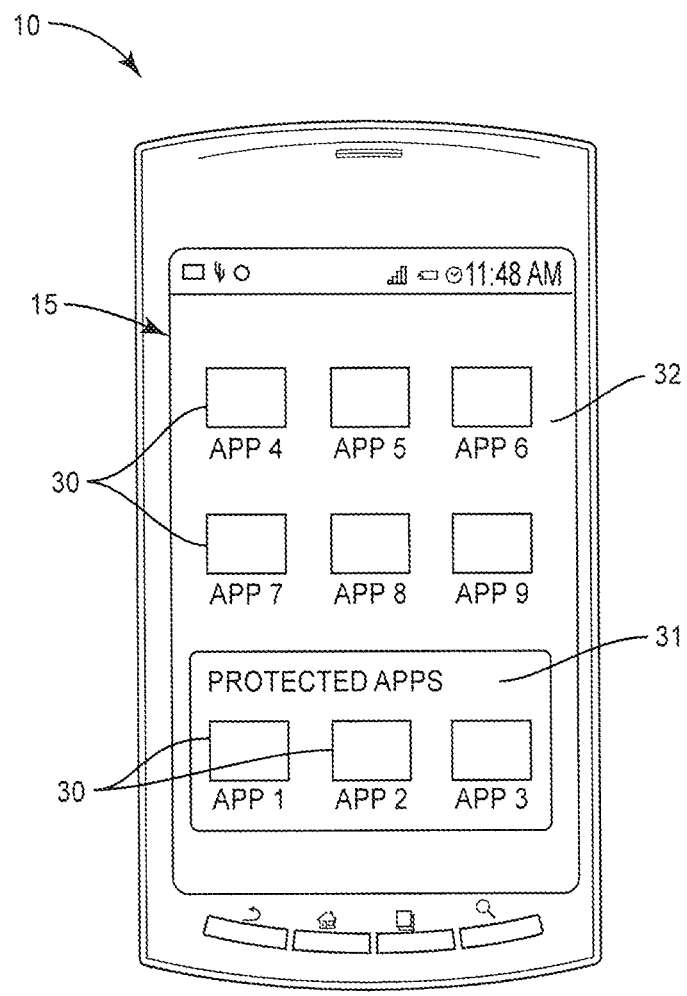
FIG. 3 illustrates a file display screen that includes icons for both protected and unprotected files.

FIG. 3 illustrates an embodiment of a second display that is rendered on the electronic display 15 after the device 10 is unlocked. In this embodiment, the electronic display 15 includes icons 30 corresponding to both protected and unprotected applications. Thus, in FIG. 3, the type of files being used are applications. The unprotected applications correspond to a first security level and the protected applications correspond to a higher second security level. The inclusion of both types of applications on the electronic display 15 allows the user to visually see and to determine which files 20 may be accessed without having to enter a passcode. In the embodiment of FIG. 3, the icons 30 for the applications with passcode protection may be arranged in a first area 31, and icons 30 for applications without passcode protection may be arranged in a different second area 32. Various arrangements may be used to segregate or otherwise display the icons 30 to the user. By selecting an icon for an unprotected application (e.g., the icon for "App 4"), a user could obtain access to the application in question while bypassing any passcode entry that would otherwise be required if App 4 was a protected application. If a user selects an application in the first area 31 and enters the corresponding passcode, the user will be able to access the other applications displayed in the first area 31 during the current session without re-entering the passcode.

Figure 3A:
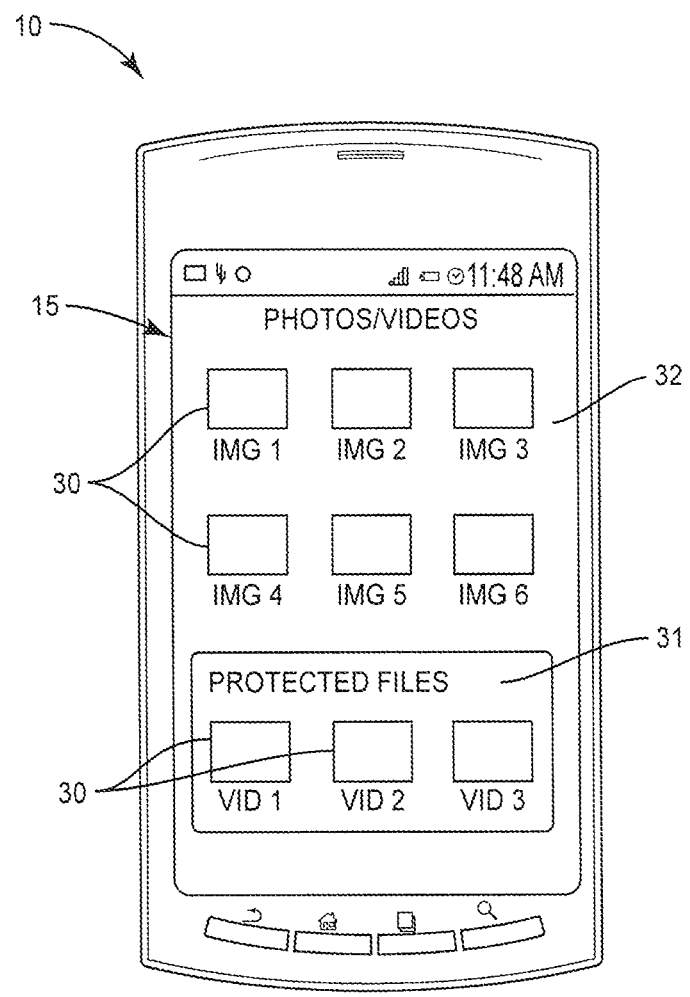
FIG. 3A illustrates a file display screen that includes icons for both protected and unprotected files.

Although application files are shown in FIG. 3, it is understood that file protection could be applied to other types of files, such as pictures, videos, music files, documents, etc. FIG. 3A illustrates another example in which image files 20 are unprotected, but video files 20 are protected. Icons 30 representing the protected video files 20 are displayed in the first area 31 and icons 30 of unprotected image files 20 are displayed in the second area 32.

Figure 4:
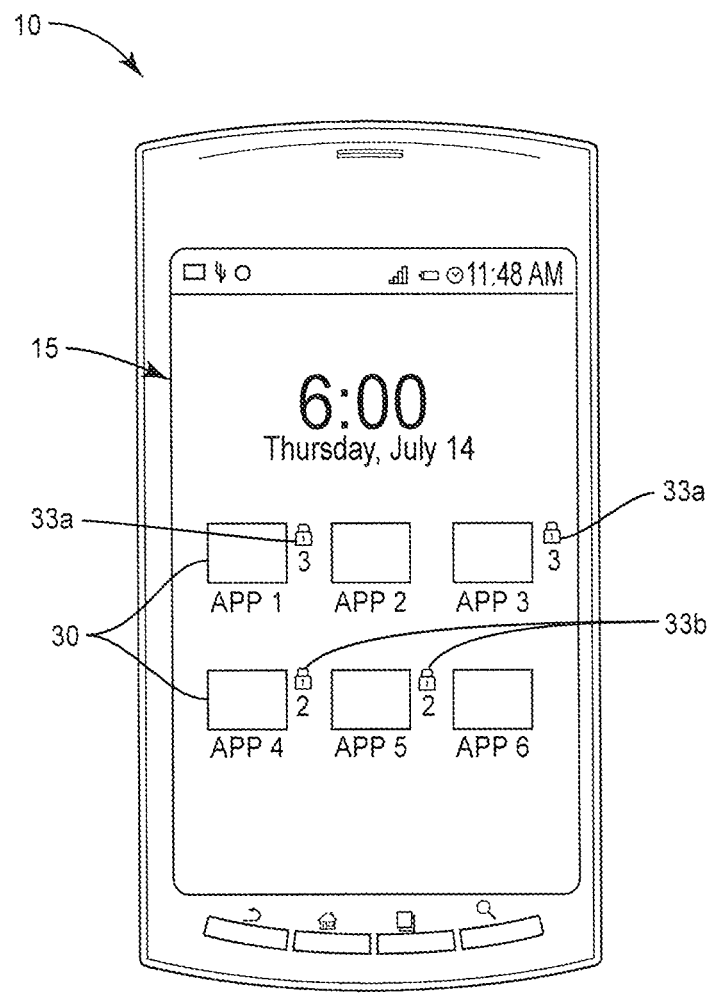
FIG. 4 illustrates a file display screen that includes icons for both protected and unprotected files.

FIG. 4 illustrates an embodiment in which icons 30 for both protected and unprotected files are displayed together in an interspersed fashion in the electronic display 15. To visually differentiate the files, the icons for protected files include a lock image 33 which modifies the icons (such that the same general icon is used for a given file in protected or unprotected form, except that the lock image is also included if the file is protected). The lock image 33 indicates that a given file requires a passcode for access. Various lock images may be displayed to indicate to the user the requirement for entry a passcode for gaining access. In one embodiment, each of the lock images 33 is the same. In other embodiments, different lock images 33 are displayed in proximity to the different file icons. The different lock images 33 may represent that different passcodes are required for accessing the different files. For example, a first lock image 33a corresponding to a first passcode may appear next to each of the files requiring the first passcode. A different, second lock image 33b corresponding to a different second passcode may appear next to the files requiring the second passcode.

Once a particular passcode for a security level is entered during a session to access a particular file 20, the other files 20 in the same security level that are protected by the same passcode may be accessed without re-entering the passcode. Using the example of FIG. 4, applications 4 and 5 are each protected by the same passcode and thus are on a common security level. This is indicated by the common lock image 33b in proximity to each icon 30. Once the passcode is entered by the user while accessing one of the applications, the other application may also be accessed without re-entering the passcode. However, other applications on different security levels require their corresponding passcode prior to access. Again using the example of FIG. 4, the user would be required to enter the passcode corresponding to the third security level for applications 1 and 3 even after already having entered the passcode for the second security level for applications 4 and 5.

Figure 4A:
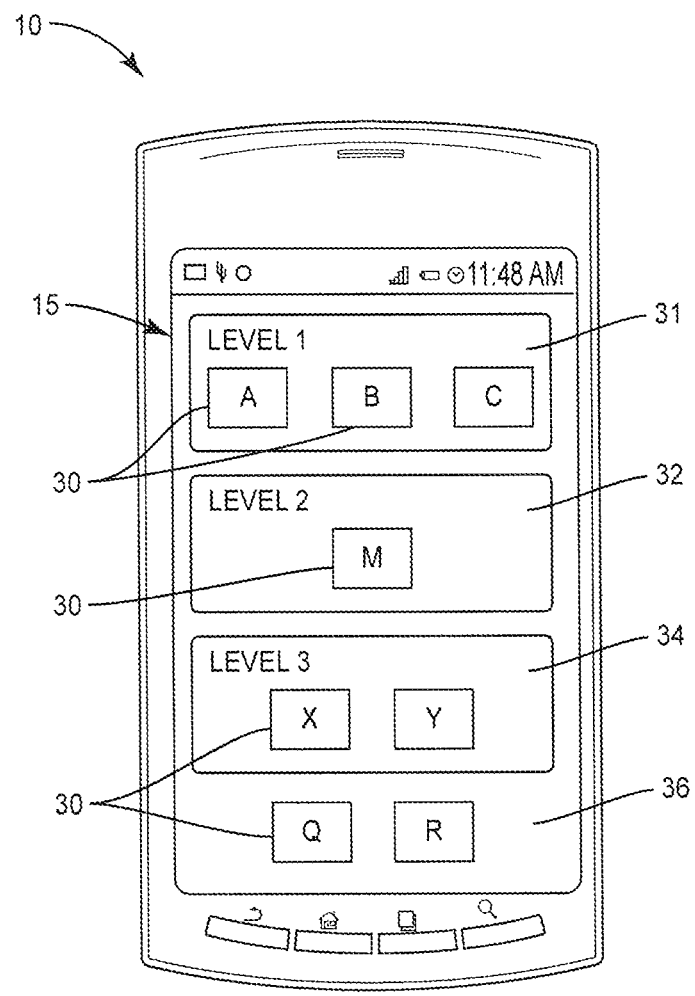
FIG. 4A illustrates a file display screen that includes icons for both protected and unprotected files.

The various files 20 in the different security levels may be displayed in different manners. FIG. 4 includes one embodiment in which a common image 33b appears next to the file icons in each security level. In another embodiment, the icons for the files 20 in the different security levels are segregated in different areas on the display 15. FIG. 4A illustrates one embodiment in which the file icons 30 in different security levels are arranged in different areas on the display 15. Icons 30 for files 20 protected with a first level of security are displayed in a first area 31. Icons 30 for files 20 protected by a second level of security are displayed in a second area 32. Icons 30 for files 20 protected by a third level of security are displayed in a third area 34. Once the user enters a particular passcode within a session for a particular level of security, the user is able to access the other files 20 within the same security level. However, the user is required to enter the corresponding passcodes to access files in the other security levels. The display 15 may further include a fourth region 36 to include icons 30 for files 20 that are not passcode protected.

It is understood that the techniques discussed herein are applicable to various types of files, such as mobile applications as illustrated in the embodiments of FIGS. 3 and 4.

Files 20 may include but are not necessarily limited to pictures, videos, mobile applications, music files, documents, and other types of files. Therefore, the term "APP" in the Figures is non-limiting, and considered to fall under the term "file" as used herein.

Figure 5:
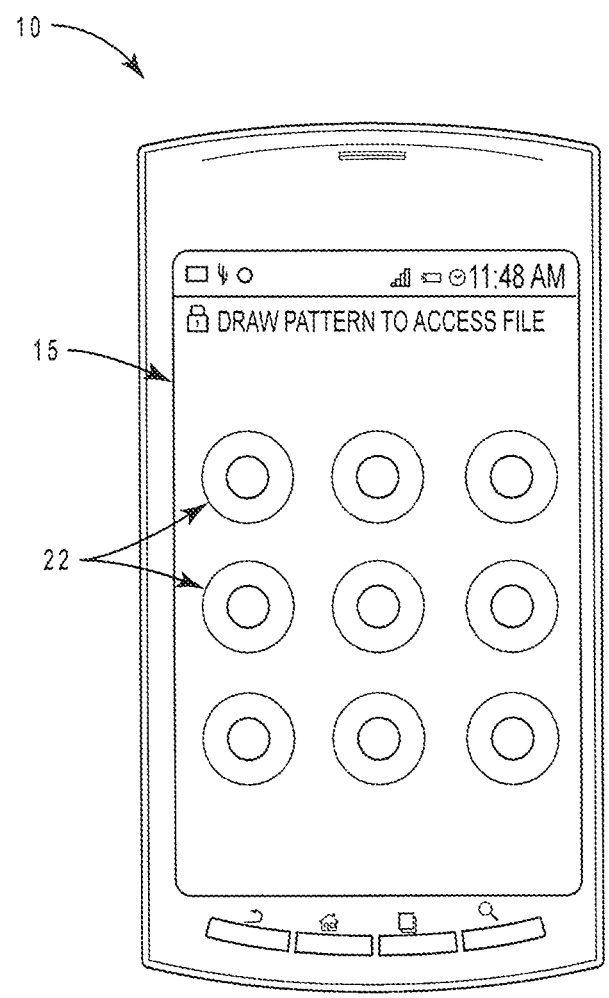
FIG. 5 illustrates an exemplary lock screen display that includes input elements arranged about the display screen.

In various embodiments, the user may select an icon 30 corresponding to either an unprotected or protected file 20. If an unprotected file is selected, the device 10 accesses and displays the file 20 without the user entering the passcode. If a protected file is selected, the device prompts the user for a passcode, such as through a request screen as illustrated in FIG. 5. The embodiment of FIG. 5 includes input elements 22 arranged across the electronic display 15 for the user to draw a pattern corresponding to the passcode. Once the correct pattern is entered, the device 10 accesses and displays the file to the user. Of course, it is understood that a more traditional passcode entry screen could be utilized, which includes alphanumeric identifiers. In one or more embodiments, the passcode entry screen may also display the particular security level of the particular passcode. This may assist the user in understanding that the other files 20 within the particular security level may also be accessed once the passcode is input.

Figure 6:
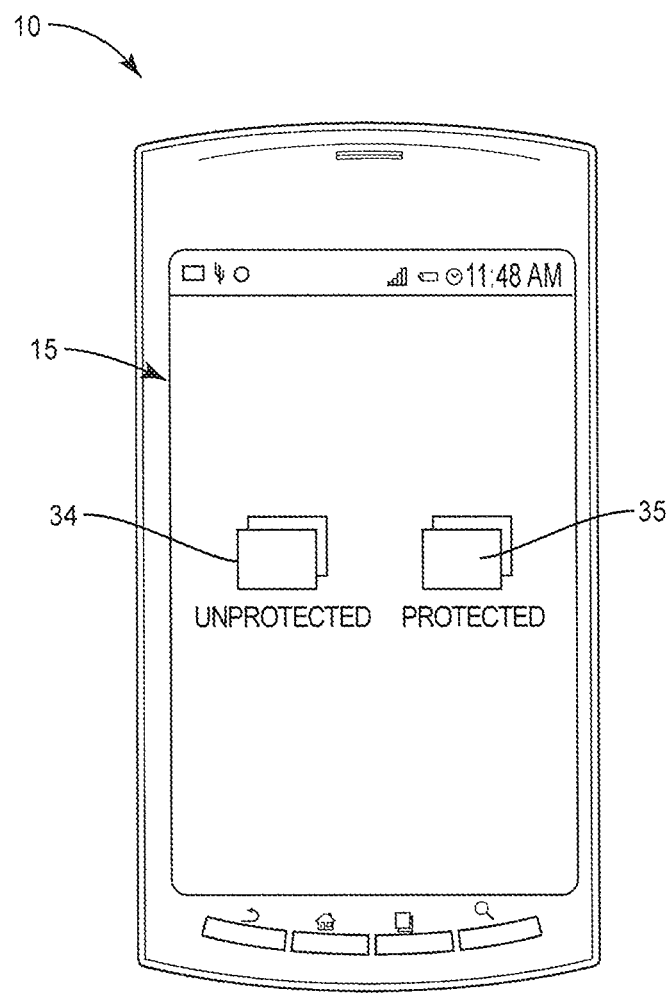
FIG. 6 is a file display screen that includes folder icons for both protected and unprotected files.
Figure 6A:
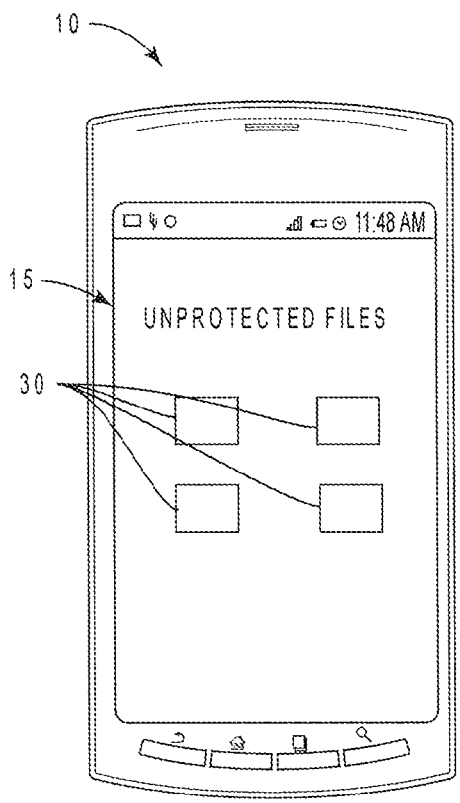
FIG. 6A is a display screen that includes icons for unprotected files.

In another embodiment as illustrated in FIG. 6, the electronic display 15 displays a first folder icon 34 indicating the existence of unprotected files and a second folder icon 35 indicating protected files. If an input is received corresponding to the unprotected folder, icons 30 for the unprotected files are then displayed on the electronic display 15 as illustrated in FIG. 6A. A user is able to select one of the icons 30 to access the corresponding unprotected file.

Figure 6B:
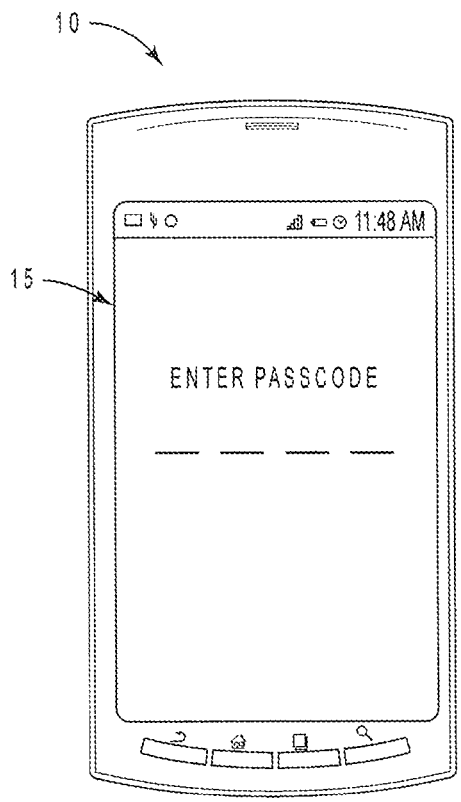
FIG. 6C is a display screen that includes icons for protected files.
Figure 6C:
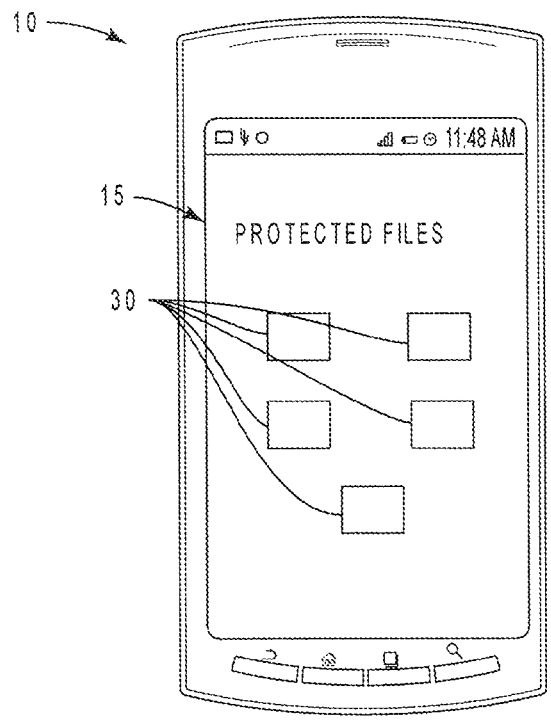

When the user selects the protected folder from the electronic display 15 of FIG. 6, the device 10 is configured to request entry of the passcode as illustrated in FIG. 6B. Once the correct passcode is entered, the device 10 displays icons 30 corresponding to the protected files as illustrated in FIG. 6C. The user is then able to select the appropriate icon 30 to access the desired protected file.

In a similar embodiment, when the user selects the protected folder icon 35 (as illustrated in FIG. 6), the electronic device 10 is configured to display each of the security levels and each of the icons 30 corresponding to the protected files for each level. The user is able to select the security level of interest at which point the device 10 will request entry of the corresponding passcode. Once received, the device 10 displays the icons 30 for each of the files protected by the input passcode in the security level.

In one or more of these embodiments, the user is able to visually observe indicated files 20 on the device 10 without entering the passcode. In the event the user selects one of the files 20 that is not passcode protected, the device 10 accesses the file upon receiving a corresponding input from the user (e.g., icon selection). For files 20 that include passcode protection, an input screen is displayed for the user to input the corresponding passcode. Once the correct passcode is received, the user is able to access the file.

Figure 7:
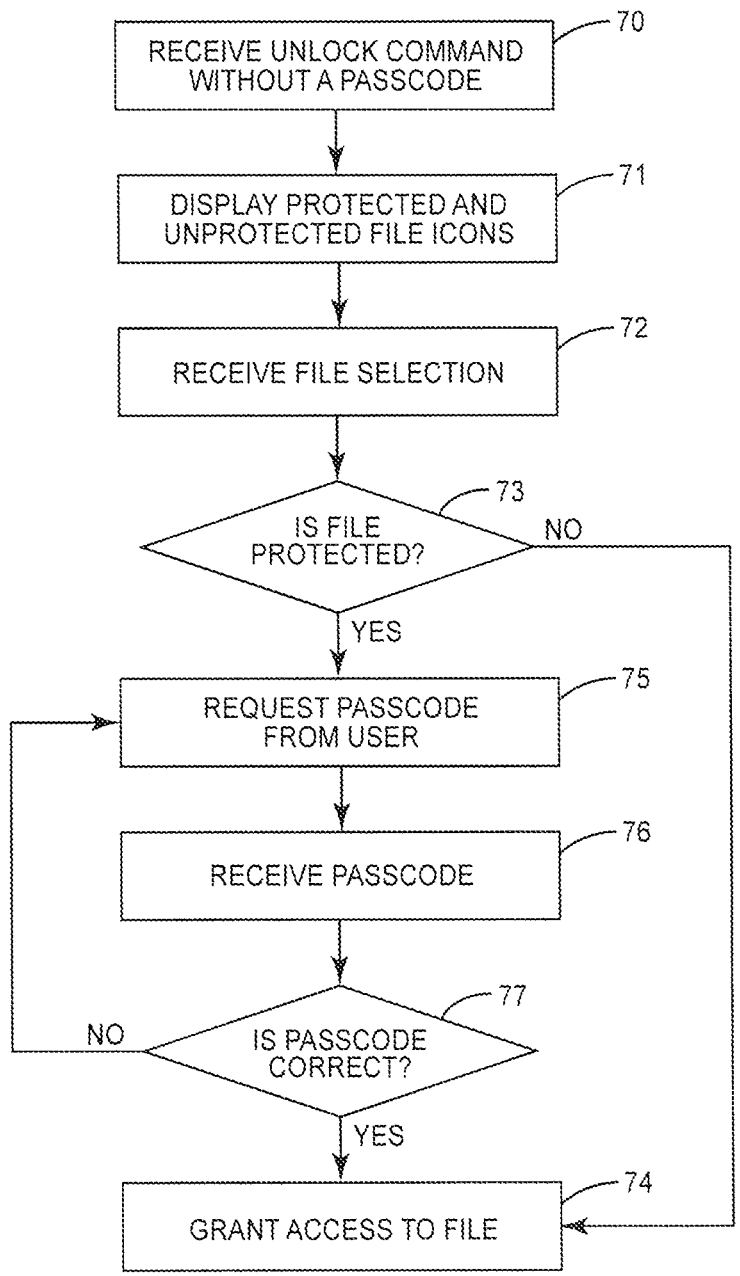
FIG. 7 is a flowchart diagram illustrating a method of granting access to a file to a user.

FIG. 7 illustrates one method of granting access to a file. The method starts with receipt of an unlock command from the user (block 70). This command may correspond to an unlock display that is displayed to the user. Upon receipt, the device 10 then displays file icons 30 on the electronic display (block 71). The icons 30 correspond to both protected and unprotected files 20 that can be accessed through the device 10. The files 20 may include those that are stored in the memory 12 of the device 10, or that may be accessed from a remote location.

The device 10 then receives an input corresponding to one of the displayed icons 30 (block 72). The device 10 determines whether the file 20 corresponding to the selected icon 30 requires entry of a passcode prior to access (block 73). If a passcode is not required, the user is able to access the file 20 (block 74).

If the corresponding file is passcode protected, then the device 10 prompts the user for the passcode (block 75). Once the passcode is received from the user (block 76), the device 10 confirms that it is correct (block 77). If the passcode is not correct, the user will again be prompted for the passcode (block 75). If the passcode that is received is correct, then the user is allowed access to the file (block 74).

Figure 7A:
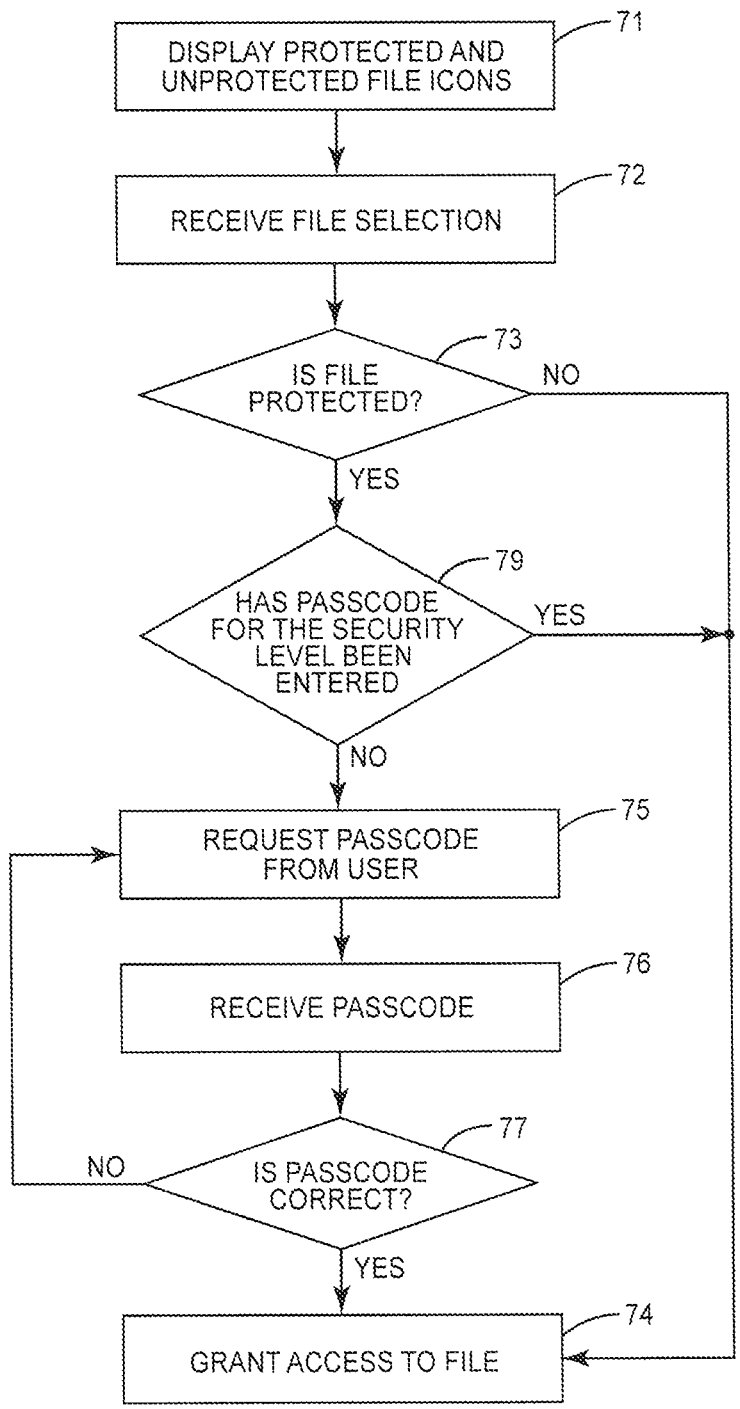
FIG. 7A is a flowchart diagram illustrating a method of granting access to a file to a user.

FIG. 7A illustrates one method of granting access to a file after one or more previous files have already been accessed during a session. The device 10 displays file icons 30 on the electronic display (block 71) corresponding to both protected and unprotected files 20. The device 10 then receives an input corresponding to one of the displayed icons 30 (block 72). The device 10 determines whether the file 20 corresponding to the selected icon 30 requires entry of a passcode prior to access (block 73). If a passcode is not required, the user is able to access the file 20 (block 74).

If the corresponding file is passcode protected, the device determines whether the passcode for the particular security level has already been entered during the session (block 79). If the passcode has already been entered, the user is able to access the file 20 (block 74). If the passcode for the particular security level has not already been entered, the device 10 prompts the user for the passcode (block 75). Once the passcode is received from the user (block 76), the device 10 confirms that it is correct (block 77). If the passcode is not correct, the user will again be prompted for the passcode (block 75). If the passcode that is received is correct, then the user is allowed access to the file (block 74).

The device 10 may further be configured to performing methods of protecting a file 20 with a passcode. The user is able to apply passcode protection such that access to the file 20 is required prior to access.

Figure 8:
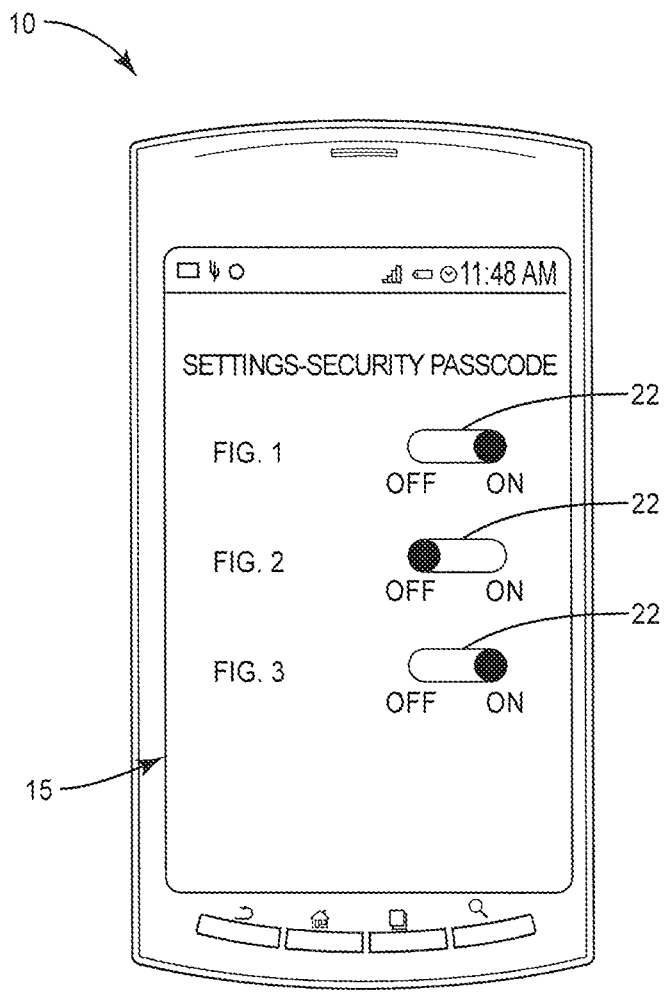
FIG. 8 is a display screen that includes passcode protection setting options for a number of files.

In one embodiment, a user is able to enter a settings menu on the device 10 and apply passcode protection to the applicable files 20. In this embodiment, the user enters the settings menu and is required to input the passcode. Once input, a settings screen as illustrated in FIG. 8 is displayed. The settings screen lists the various files 20 that are eligible for passcode protection and a slider bar 22 for each listed file 20. The user is able to move the slider bar 22 to the applicable setting for each file 20. Once the settings are complete, the user may exit the screen to save the passcode settings. Files 20 in which the protection was turned to the "on" position will require entry of a passcode for access. Files 20 with an "off" setting may be accessed without the passcode. In one or more embodiments, the settings menu provides for the user to select the security level for each particular file 20. For the applicable files, the user is able to group the files into the desired security levels.

In one specific embodiment, the settings menu can be used for mobile applications. One or more mobile applications are downloaded to the device 10 and saved in memory 12. Thereafter, the user enters an application menu from a home screen. The application menu includes a settings option which the user can toggle to view the settings menu as illustrated in FIG. 8.

Although a toggle switch is illustrated in the embodiment in FIG. 8, various other manners of activating passcode protection for the various files may be used.

Figure 9:
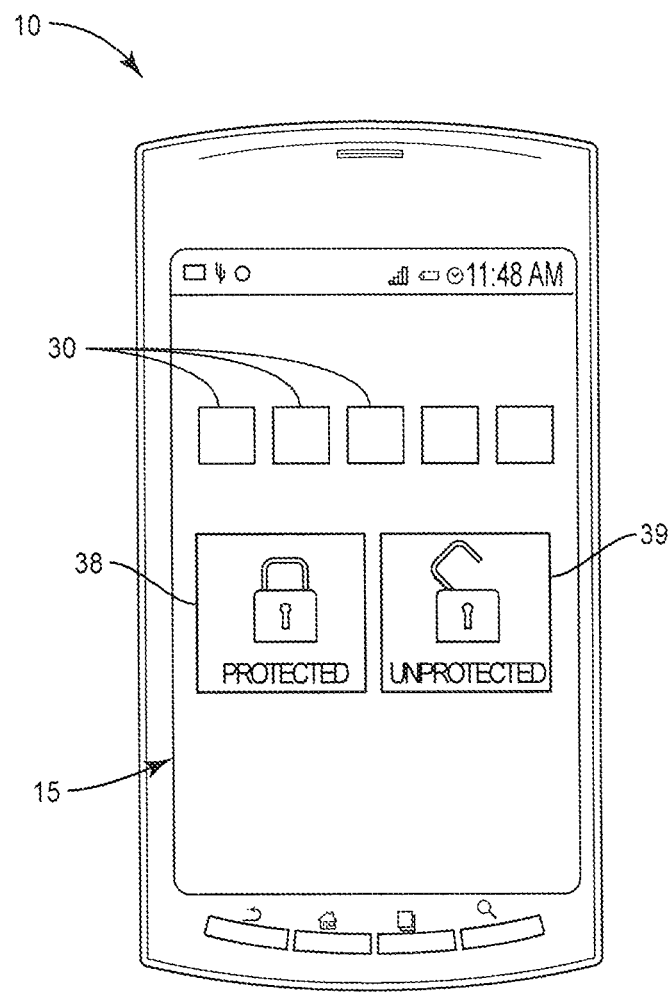
FIG. 9 is a display screen that facilitates enabling and/or disabling of passcode protection for files.

FIG. 9 illustrates another embodiment for enabling passcode protection on a file. The electronic display 15 includes a first folder icon 38 for passcode protected files and a second folder icon 39 for unprotected files. Icons 30 representing the various device files 30 are also included on the display. The user is able to move the icons 30 to an overlapping position with the desired folder 38, 39. For files 20 that require passcode protection, the user drags the corresponding icon 30 to the protected folder icon 38 and drops the icon 30. Likewise, icons 30 for files that do not require passcode protection may be dragged and dropped on the unprotected file icon 39. In one or more embodiments, the user is further able to designate the particular security level for each file 20 selected to have passcode protection. In one specific embodiment, the display 15 includes separate folders for each security level. The user drags the corresponding icon 30 to the folder corresponding to the desired security level.

In one embodiment, the user is required to enter the passcode prior to the selected files being enabled with passcode protection. The passcode entry may be required at an input screen displayed prior to or after display of the selection screen of FIG. 9. In one embodiment, the passcode entry is required after the first icon 30 is dragged and dropped onto the protected file icon 38.

In another embodiment, the electronic display 15 includes an icon 30 that acts as a lock enabler/disabler for files 20. File icons 30 are also displayed on the electronic display 15. The device 10 is further configured to provide a manage/edit mode that a user is able to select. Once selected, a protection icon is displayed on the screen 15. The user is then able to drag and drop the corresponding icons 30 onto the protection icon to enable passcode protection. In this embodiment, the user again may be required to enter the passcode at some point prior to enabling protection of the selected files 20. Similarly, the user could also drag a protected file 20 onto the lock enabler/disabler to disable the protection of the file.

In one or more embodiments, a passcode is entered just once during a session. Once entered, the filed protected by the passcode can be accessed throughout the session without requiring re-entry of the passcode. In some such embodiments, a session is terminated when the electronic device 10 enters a sleep mode and/or when the device 10 is locked. In one or more embodiments, various inputs may be used to unlock the device 10. These include but are not limited to finger print recognition, input of a personal identification number, and tracing a pattern on the display screen.

In one or more embodiments, the different security levels may be accessed using different passcodes. By way of example, a first security level requires a first passcode (e.g., finger print recognition of a first user) and a second security level requires a second passcode (e.g., a finger print of a second user).

Although smartphone and tablet computing devices which utilize a shared user account have been described above, it is understood that the techniques discussed herein are not limited to those types of computing devices. Rather, those types of computing devices are non-limiting examples. The techniques discussed herein could be applied to other computing devices, such as traditional desktop computers and game consoles, for example.

The present disclosure may, of course, be carried out in other ways than those specifically set forth herein without departing from essential characteristics of the disclosure. The present embodiments are to be considered in all respects as illustrative and not restrictive, and all changes coming within the meaning and equivalency range of the appended claims are intended to be embraced therein.

What is claimed is:

1. A method performed by a computing device of granting access to files during a session, the method comprising:
   initially presenting on a display screen of an electronic display of the computing device an initial display comprising a prompt for a user to enter an initial passcode, the initial display does not include any display icons;
   in response to receiving the initial passcode, presenting a first plurality of display icons on the electronic display for accessing passcode protected files that are each protected by a same passcode, the first plurality of display icons being displayed in a first limited area of the display screen indicating that each of the files corresponding to the first display icons is protected by the same passcode;
   concurrently with presenting the first plurality of display icons, presenting a second plurality of display icons on the electronic display for accessing files that are not protected by the passcode, the second plurality of display icons being displayed in a second limited area of the display screen that is spaced from the first area to indicate that each of the files corresponding to the second display icons is not protected by the passcode;
   receiving a selection of one of the display icons from a user;
   if the selected display icon links to a file that is not passcode protected by the passcode, granting access to the file without requiring entry of the passcode; and
   if the selected display icon links to a passcode protected file and the passcode has already been received during a current session, granting access to the file without requiring entry of the passcode;
   if the selected display icon links to a passcode protected file and the passcode has not already been received during the current session, presenting a request for the passcode and granting access to the file after receiving the passcode.

2. The method of claim 1, further comprising:
   in response to receiving the initial passcode, concurrently with presenting the first and second plurality of display icons, presenting a third plurality of display icons on the electronic display for accessing passcode protected files that are each protected by a second passcode, the third plurality of display icons being displayed in a third limited area of the display screen that is spaced from each of the first and second areas to indicate that each of the files corresponding to the third display icons are each protected by the second passcode;
   receiving the selection of one of the display icons from the user;
   if the selected display icon links to a file protected by the second passcode and the second passcode has already been received during a current session, granting access to the file without requiring entry of the second passcode;
   if the selected display icon links to a file protected by the second passcode and the second passcode has not already been received during the current session, presenting a request for the second passcode and granting access to the file after receiving the second passcode.

3. The method of claim 1, further comprising displaying a common lock image adjacent to each of the first plurality of display icons, the common lock image indicating that each of the files corresponding to the icons is protected by the same passcode.

4. A method performed by a computing device of granting access to files during a session, the method comprising:

prior to presenting on a display screen a first group of display icons, presenting a lock screen to the user which includes at least one input element requesting entry of an initial passcode, the lock screen comprising no display icons;

in response to receiving the initial passcode, presenting concurrently on the display screen of the computing device two or more groups of the display icons for accessing passcode protected files, wherein each group of icons uses a different shared passcode for its passcode protected files, and wherein within a single group each display icon uses the same shared passcode for its protected file;

displaying on the display screen each of the groups of display icons in a visually distinct manner indicating for each of the display icons which group they are included with;

for each of the groups, displaying a common lock image next to each display icon in the group to visually reinforce that each of the corresponding passcode protected files is protected by the same shared passcode;

receiving a selection of one of the display icons from a user;

if the selected display icon links to a passcode protected file that is protected by one of the shared passcodes and the shared passcode has already been received during a current session, granting access to the file without requiring entry of the shared passcode; and if the selected display icon links to a passcode protected file that is protected by one of the shared passcodes and the shared passcode has not already been received during the current session, presenting a request for the shared passcode and granting access to the file after receiving the shared passcode.

\* \* \* \* \*